(12) United States Patent
Wynter et al.

(10) Patent No.: US 9,207,105 B2
(45) Date of Patent: Dec. 8, 2015

(54) SYSTEM AND METHOD FOR INCIDENT DETECTION WITH SPATIOTEMPORAL THRESHOLDS ESTIMATED VIA NONPARAMETRIC QUANTILE REGRESSION

(71) Applicant: International Business Machines Corporation, Armonk, NY (US)

(72) Inventors: Laura Wynter, Westport, CT (US); Ioannis Kamarianakis, Yorktown Heights, NY (US)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 146 days.

(21) Appl. No.: 13/927,245

(22) Filed: Jun. 26, 2013

(65) Prior Publication Data
US 2015/0006110 A1    Jan. 1, 2015

(51) Int. Cl.
G06G 7/76 (2006.01)
G06F 17/18 (2006.01)
G01D 18/00 (2006.01)
G01D 3/10 (2006.01)

(52) U.S. Cl.
CPC ............... G01D 18/002 (2013.01); G01D 3/10 (2013.01)

(58) Field of Classification Search
CPC ... G01D 21/00; G08G 1/0104; G08G 1/0133; G06F 19/00; G06F 17/18; G06F 7/76
See application file for complete search history.

(56) References Cited

U.S. PATENT DOCUMENTS

| | | |
|---|---|---|
| 5,774,569 A | 6/1998 | Waldenmaier |
| 6,411,328 B1 | 6/2002 | Franke et al. |
| 6,470,261 B1 | 10/2002 | Ng et al. |
| 6,985,172 B1 | 1/2006 | Rigney et al. |
| 7,145,475 B2 | 12/2006 | Kavner |
| 8,340,718 B2 | 12/2012 | Colonna et al. |
| 2006/0235833 A1 | 10/2006 | Smith et al. |
| 2009/0082948 A1 | 3/2009 | Hiruta et al. |
| 2011/0319099 A1 | 12/2011 | Beuk |
| 2015/0006111 A1* | 1/2015 | Wynter et al. ................ 702/189 |

FOREIGN PATENT DOCUMENTS

| | | |
|---|---|---|
| EP | 2023308 A1 | 2/2009 |
| EP | 2287821 A1 | 2/2011 |

(Continued)

OTHER PUBLICATIONS

He et al., Incident Duration Prediction with Hybrid Tree-Based Quantile Regression, Jun. 21, 2011, IBM Research Report, RC25175 (W1106-070), 19 pp.*

(Continued)

*Primary Examiner* — Toan Le
(74) *Attorney, Agent, or Firm* — Ryan, Mason & Lewis, LLP (57) ABSTRACT

Systems and methods for incident detection are provided. A system for incident detection includes a network including at least one detector for detecting events in the network, a detection module capable of processing data from the at least one detector, and a calibration module capable of calibrating a plurality of bands for the incident detection based on a plurality of decision variables, wherein the plurality of bands define thresholds that are time-varying for all measurement locations in the network, and the thresholds are estimated using nonparametric quantile regression.

8 Claims, 6 Drawing Sheets

(56) References Cited

FOREIGN PATENT DOCUMENTS

WO      2011153115 A2     12/2011
WO      2012104393 A1     8/2012

OTHER PUBLICATIONS

Payne, Harold J., Freeway Incident Detection Based Upon Pattern Classification, Dec. 10-12, 1975, 1975 IEEE Conference on Decision and Control including the 14th Symposium on Adaptive Processes, pp. 688-692.*

Payne, Harold J., Abstract, Dec. 10-12, 1975, 2 pp.*

S. Tang et al., "Traffic Incident Detection Algorithm Based on Non-Parameter Regression," IEEE 5th International Conference on Intelligent Transportation Systems, Sep. 2002, pp. 714-719, Singapore.

P. Ng et al., "A Fast and Efficient Implementation of Qualitatively Constrained Quantile Smoothing Splines," Statistical Modelling: An International Journal, Dec. 2007, pp. 1-13, vol. 7, No. 4.

A. Antoniadis et al., "Nonparametric Pre-Processing Methods and Inference Tools for Analyzing Time-of-Flight Mass Spectrometry Data," Current Analytical Chemistry, Apr. 2007, pp. 127-147, vol. 3, No. 2.

D. Gerdesmeier et al., "An Alternative Method for Identifying Booms and Busts in the Euro Area Housing Market," European Central Bank Working Paper No. 1493, Nov. 2012, 40 pages.

R. Koenker et al., "Quantile Regression," The Journal of Economic Perspectives, Fall 2001, pp. 143-156, vol. 15, No. 4.

Dr. P.T. Martin et al., Incident Detection Algorithm Evaluation, Research Report prepared for Utah Department of Transportation, Mar. 2001, 54 pages.

Dr. E. Parkany et al., "A Complete Review of Incident Detection Algorithms & Their Deployment: What Works and What Doesn't," Technical Report prepared for The New England Transportation Consortium, Project No. 00-7, Feb. 2005, 120 pages.

H.J. Payne et al., "Freeway Incident-Detection Algorithms Based on Decision Trees with States," Transportation Research Board, pp. 30-37, 1978, No. 682.

Y.J. Stephanedes et al., "Freeway Incident Detection Through Filtering," Transportation Research Part C: Emerging Technologies, Sep. 1993, pp. 219-233, vol. 1, No. 3.

* cited by examiner

SYSTEM AND METHOD FOR INCIDENT DETECTION WITH SPATIOTEMPORAL THRESHOLDS ESTIMATED VIA NONPARAMETRIC QUANTILE REGRESSION

TECHNICAL FIELD

The field generally relates to systems and methods for incident detection and, in particular, to systems and methods for incident detection based on decision-tree algorithms, with spatiotemporal thresholds on the variables that participate in the decision-tree, estimated via nonparametric quantile regression.

BACKGROUND

Automatic incident detection has become a relied on feature in command center operations. While various automatic incident detection methods are known, existing methods are unreliable due to excessive false alerts. In the past, data availability was more limited. Today, with the availability of better and more real-time data and systems that can optimize and re-optimize model parameters on a reasonably frequent schedule (e.g., weekly), it is possible to develop better and more robust methods for incident detection.

Since an important function of a command center is to respond to incidents, it is anticipated that the embodiments of the invention will be an important aspect of a modern command center toolkit.

SUMMARY

In general, exemplary embodiments of the invention include systems and methods for incident detection and, in particular, to systems and methods for incident detection based on decision-tree algorithms, with spatiotemporal thresholds on the variables that participate in the decision-tree, estimated via nonparametric quantile regression.

According to an exemplary embodiment of the present invention, a system for incident detection comprises a network including at least one detector for detecting events in the network, a detection module capable of processing data from the at least one detector, and a calibration module capable of calibrating a plurality of bands for the incident detection based on a plurality of decision variables, wherein the plurality of bands define thresholds that are time-varying for all measurement locations in the network, and the thresholds are estimated using nonparametric quantile regression.

According to an exemplary embodiment of the present invention, a method for incident detection, comprises designating a plurality of decision variables for incident detection, and calibrating a plurality of bands for the incident detection based on the decision variables, wherein the plurality of bands define thresholds that are time-varying for all measurement locations in a network, and the thresholds are estimated using nonparametric quantile regression.

According to an exemplary embodiment of the present invention, an article of manufacture comprises a computer readable storage medium comprising program code tangibly embodied thereon, which when executed by a computer, performs method steps for incident detection, the method steps comprising designating a plurality of decision variables for incident detection, and calibrating a plurality of bands for the incident detection based on the decision variables, wherein the plurality of bands define thresholds that are time-varying for all measurement locations in a network, and the thresholds are estimated using nonparametric quantile regression.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Exemplary embodiments of the invention will now be discussed in further detail with regard to systems and methods for incident detection and, in particular, to systems and methods for incident detection with spatiotemporal thresholds estimated via nonparametric quantile regression. This invention may, however, be embodied in many different forms and should not be construed as limited to the embodiments set forth herein.

Embodiments of the present invention provide methods and systems for determining thresholds in decision-tree based approaches for incident detection. For each decision variable, a location-specific band of time-varying width is created using nonparametric quantile regression. Incident alarms and detections are characterized by the presence of decision-variable related data outside their bands. The embodiments of the present invention provide: a) calibration of an algorithm which is not location specific; irrespective of the number of measurement locations in a network (e.g., road network), with k decision variables the modeler needs to calibrate at most 2k+2 parameters; b) depending on the chosen decision variables, the algorithm may distinguish between incidents that occur upstream or downstream with respect to a measurement location; c) the proposed method accounts for possible asymmetries in the distributions of the decision variables, in contrast with previous approaches that construct bands based on multiples of standard deviations; d) the method is straightforward in its implementation, in contrast to approaches based on pattern recognition and machine learning; furthermore it allows complete freedom with regard to the decision variables which can be arbitrary functions of variables of the subject network (e.g., traffic).

Embodiments of the present invention are applicable to transportation networks, but are not limited thereto, and can be applied to other network types as well, including, but not limited to spatially disaggregated data networks, water networks, electricity networks, etc. In connection with the transportation network example, in general, embodiments of the present invention take real-time traffic data and perform checks to determine whether alert(s) should be provided or created, and if the alert(s) persist at the next time traffic data is received, then it is determined whether a detection should be issued.

Embodiments of the present invention use, for example, detectors or sensors, which detect traffic levels. For example, and without limitation, inductive loops, which are fixed and record the passage of every vehicle over the loop, and/or global positioning system (GPS) tags on vehicles that record speeds, can be used. However, the embodiments are not limited to the above detection devices.

The term "occupancy" or "occupancy level" as used herein can refer to a traffic parameter recorded by the fixed sensors or detectors, and can be defined as a percentage of time that a road is occupied over a given time interval. For example, given a 5-minute interval, the occupancy is the percentage of time over that 5-minute interval that the road is occupied. Occupancy is used in connection with the embodiments of the present invention. As alternatives, other variables may be used, such as, for example, speed.

The term "shock in occupancy" or "occupancy shock" as used herein can refer to a temporal difference at a single location of an occupancy (e.g., $occ_t - occ_{t-1}$).

Incident detection algorithms based on traffic data from fixed sensors can be classified into a relatively large number of classes. Some of the classifications include, for example: a) comparative algorithms based on decision-trees that use a set of decision variables and a set of thresholds (e.g., location specific) to classify a traffic state in a particular location as incident free, potential incident or incident; b) time-series approaches, based on accurate forecasting models of traffic variables; in this case incident detection occurs when detector measurements deviate significantly from the corresponding forecasted values; and c) artificial intelligence algorithms typically based on fuzzy logic and/or neural networks.

Embodiments of the present invention relate to the comparative algorithms based on decision-trees noted in a) above. An example of a known comparative algorithm based on decision-trees is the California algorithm 7; its structure being depicted in FIG. 1. Decision tree algorithms as used herein are based on decision variables and thresholds on these decision variables.

Figure 1:
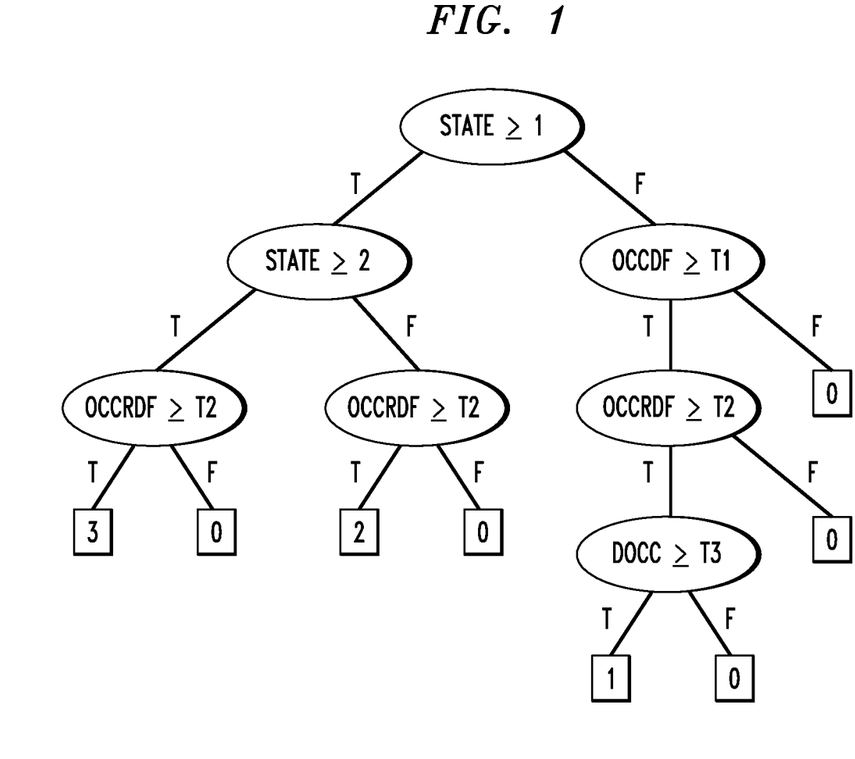
FIG. 1 shows a decision tree for California algorithm 7.

DOCC denotes downstream occupancy observed at time t (i.e., $occ_t^d$), OCCDF represents a spatial difference in occupancies between a set of (upstream and downstream) detectors (i.e., $occ_t^u - occ_t^d$) and OCCRDF is the relative spatial difference in occupancies (i.e., $(occ_t^u - occ_t^d)/occ_t^u$), where u and d represent upstream and downstream, respectively. T1, T2 and T3 represent thresholds for DOCC, OCCDF and OCCRDF, respectively, and the state variable takes on four values: 0 (incident-free), 1 (potential incident), 2 (incident occurred) and 3 (incident continuing).

Referring to FIG. 1, if state≥1 is determined to be true, following line T ("true"), then an alarm for a potential incident has been detected, and it is queried whether there has been an alarm for the occurrence of the incident (state≥2), and if deemed true, it is further queried whether the relative spatial difference in occupancies OCCRDF is equal to or exceeds threshold T2 to conclude detection of a continuing incident 3, or if less than threshold T2 to conclude incident-free 0. If state≥2 is not deemed to be true, following line F ('false"), it is further queried whether the relative spatial difference in occupancies OCCRDF is equal to or exceeds threshold T2 to conclude detection of a potential incident 2, or if less than threshold T2 to conclude incident-free 0. If state≥1 is determined to be false, then it is queried whether a spatial difference in occupancies between a set of upstream and downstream detectors OCCDF is equal to or exceeds threshold T1. If no, there is a conclusion of "incident free" 0. If yes, then it is queried whether the relative spatial difference in occupancies OCCRDF is equal to or exceeds threshold T2. If no, there is a conclusion of "incident free" 0. If yes, then it is further queried whether downstream occupancy observed at time t DOCC is equal to or exceeds threshold T3. If no, there is a conclusion of "incident free" 0. If yes, there is a conclusion of detection of a potential incident 1.

Effective calibration of the above algorithm essentially requires substantial spatio-temporal variability in T1, T2 and T3. For instance, T2 is expected to differ substantially when a downstream detector is placed in a bottleneck as opposed to the case when the bottleneck is located upstream. A tedious calibration procedure is required for the effective implementation of algorithms like the one presented above.

Embodiments of the present invention describe methods and systems that aim to eliminate the tedious calibration procedures by requiring calibration for a small number of parameters while accounting for the spatiotemporal variability of the variables that are included in the decision tree. More specifically, embodiments of the present invention relate to systems and methods of having location specific and temporally dynamic thresholds. For example, referring to the thresholds T1, T2 and T3 from FIG. 1, due to the tedious nature of the calibrations procedures, known methods utilize static location specific thresholds fixed across all time intervals (e.g., a fixed occupancy level at a location that is the same regardless of time), which are based on fixed quantiles of the traffic data. As per embodiments of the present invention, tedious calibration procedures are eliminated using statistical techniques described further below so that the thresholds used are location specific and temporally dynamic. As a result, embodiments of the present invention, which utilize temporally dynamic thresholds, can optimize the traffic data and limit false alerts.

Figure 2:
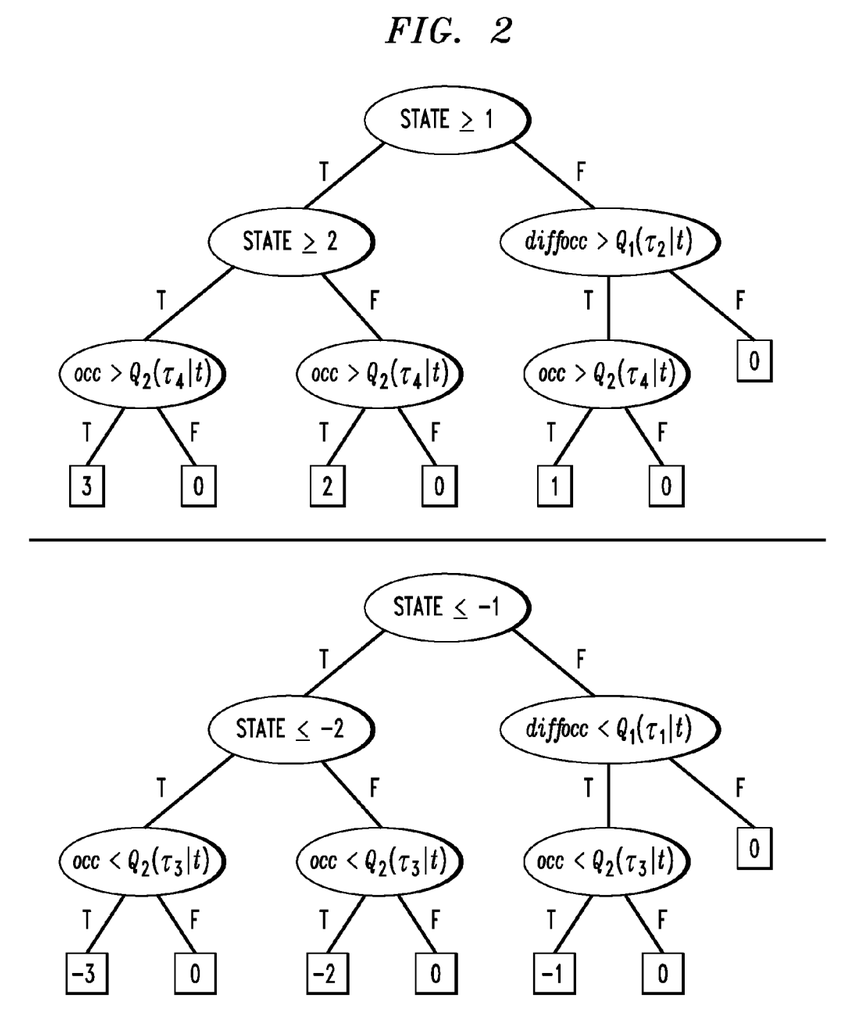
FIG. 2 shows decision trees for a customized algorithm that is based on two decision variables from a single detector, according to an exemplary embodiment of the invention.

In accordance with an embodiment of the present invention, a method uses a decision tree algorithm that is based on data from a single detector. The algorithm uses two decision variables and is depicted in FIG. 2. It is to be understood that embodiments of the present invention are not limited to the decision tree algorithm shown in FIG. 2, and other decision tree algorithms having more or less variables may be used. Referring to FIG. 2, the two decision variables are diffocc=$occ_t - occ_{t-1}$ representing shocks in occupancy observed at time t, and occ=$occ_t$ representing observed occupancy level at time t.

In the case of FIG. 2, the variable state takes on 7 values: 0 (incident-free), 1 (potential incident downstream), 2 (incident identified downstream), 3 (identified incident continuing downstream), −1 (potential incident upstream), −2 (incident identified upstream) and −3 (identified incident continuing upstream). An incident can be deemed to have occurred if data (e.g., occupancy) falls outside of specific band determined by the location specific and temporally dynamic thresholds. The algorithm looks for sufficiently large shocks in occupancies which bring occupancy levels outside a band, to trigger detection. Occupancy, specifically, shock in occupancy and occupancy level, is used in this example as the decision variable because in some cases it can lead to superior detection performance when compared to other decision variables. However, the embodiments of the present invention are not limited to occupancy as the decision variable, and other variables, such as, for example, the ratio of volumes to occupancies can be used.

According to embodiments of the present invention, calibration of the bands for incident detection is performed. The bands define the thresholds which vary based on the time of day. For each measurement location diffocc=$occ_t$−$occ_{t-1}$, represents shocks in occupancy observed at time t whereas occ=$occ_t$ represents observed occupancy levels. In contrast to the algorithm described in connection with FIG. 1, the thresholds in FIG. 2 are time-varying and for all measurement locations of the network, based on six parameters (i.e., 2k+2, where k is the number of decision variables).

In accordance with embodiments of the present invention, a quantile refers to a point from the cumulative distribution function (CDF) of the traffic variable (occupancy, in this example). In other words, the kth occupancy quantile is the value x such that the probability that the occupancy is less than x is at most k/100 and the probability that the occupancy exceeds x is at most 1−(k/100). The six parameters are defined as follows: $\tau_1$, $\tau_2$ (with $\tau_1$<$\tau_2$) are specific quantiles for shocks in occupancies (see FIG. 3 where $\tau_1$, $\tau_2$ over time are represented by lower and upper curves, respectively), $\tau_3$, $\tau_4$ (with $\tau_3$<$\tau_4$) are specific quantiles for occupancies and the last two parameters, denoted $\lambda_1$, $\lambda_2$, control the degree of smoothness of the functions, $Q_1$, $Q_2$. In accordance with an embodiment of the present invention, functions, $Q_1$, $Q_2$ are time varying.

$Q_1(\tau|t)$ is the conditional quantile function for shocks in occupancies, whereas $Q_2(\tau|t)$ is the conditional quantile function for levels of occupancies. These functions can be constructed using a known nonparametric quantile regression framework, such as, for example, the nonparametric quantile regression framework presented in Koenker, R., Quantile Regression, Chap. 7 (Cambridge University Press, 2005). The width of the bands that are based on $Q_1$ and $Q_2$ depend on the difference ($\tau_2$−$\tau_1$) and ($\tau_4$−$\tau_3$), respectively, and the variability of the location-specific decision variables; hence width of the bands that are based on $Q_1$ and $Q_2$, respectively, is time-dependent and location-specific.

Figure 3:
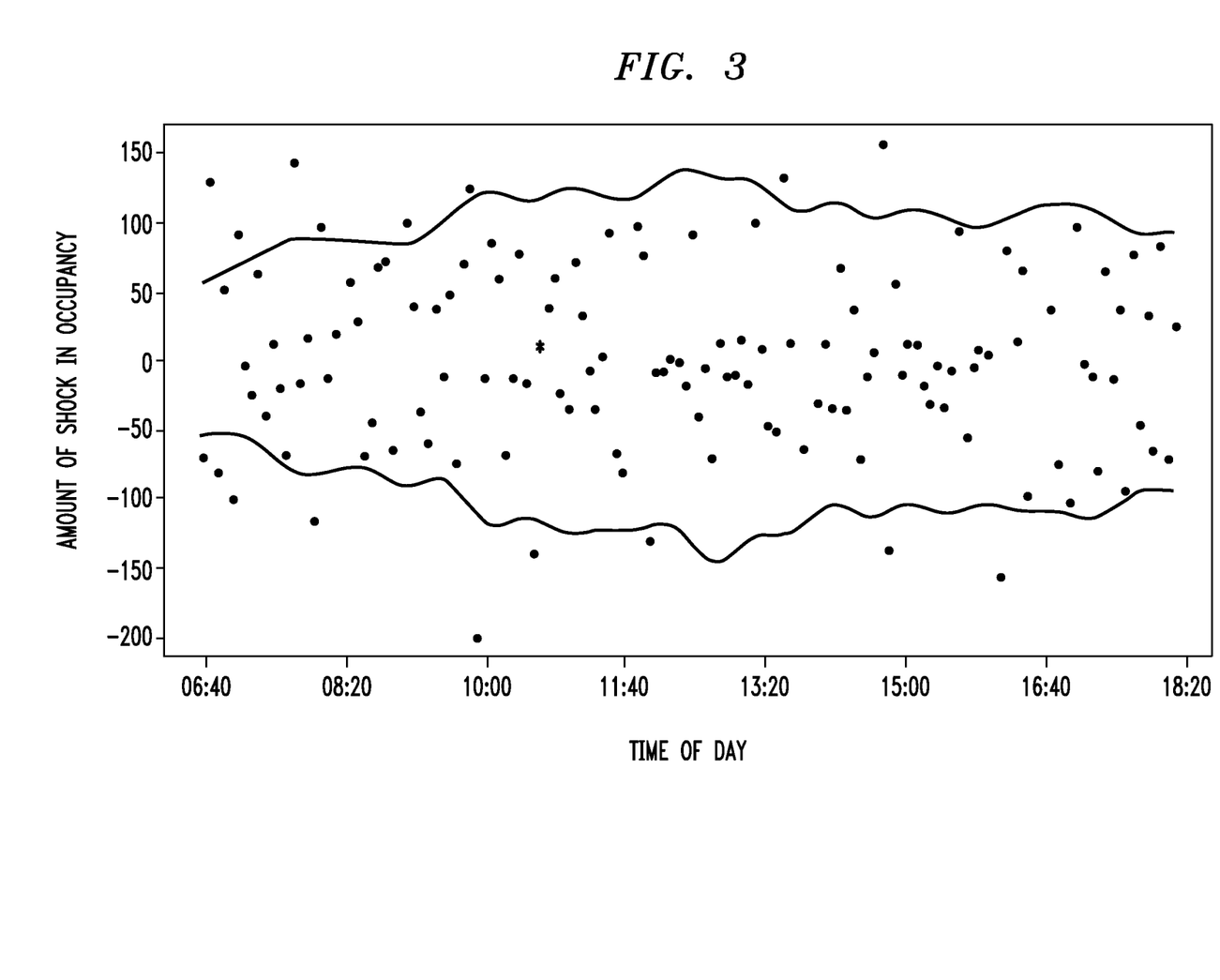
FIG. 3 is a graph of decision-bands for shocks in occupancies based on nonparametric quantile regression for a measurement location in the urban road network of the center of a city, according to an embodiment of the present invention.

FIG. 3 depicts an example of such decision bands, based on data from a particular measurement location on an urban road network in the center of a city. Specifically, FIG. 3 is a graph of decision-bands for shocks in occupancies based on nonparametric quantile regression for a measurement location in the urban road network of the center of a city. The horizontal (x) axis represents a time of day, and the vertical (y) axis represents a size of a shock. The depicted traffic data corresponds to a 12-hour period that contains morning peak.

As can be observed, the width of the band (i.e., $\tau_2$−$\tau_1$) is substantially reduced during the early morning (to the left on the graph) as occupancies display less variability during this period. Similarly, the corresponding band for a measurement location with substantially more variable traffic dynamics than the one shown in FIG. 3 would have been wider.

Referring to FIG. 3, the points outside of the band (i.e., on top of and under the curves) represent potential incidences, and points within the bands (i.e., between the curves) are points where shocks have not been triggered.

Referring back to FIG. 2, if state≥1 is determined to be true, following line T ("true"), then an alarm for a potential incident downstream has been detected, and it is queried whether there has been an alarm for an incident identified downstream (state≥2), and if deemed true, it is further queried whether the observed occupancy level occ at a time t exceeds the conditional quantile function for levels of occupancies $Q_2(\tau_4|t)$ (i.e., falling outside the band) to conclude detection of an identified incident continuing downstream 3, or if less than this temporally dynamic threshold to conclude incident-free 0 (i.e., falling inside the band). If state≥2 is not deemed to be true, following line F ("false"), it is further queried whether the observed occupancy level occ at time t exceeds the conditional quantile function for levels of occupancies $Q_2(\tau_4|t)$ (i.e., falling outside the band) to conclude detection of an incident identified downstream 2, or if less than this temporally dynamic threshold to conclude incident-free 0 (i.e., falling inside the band). If state≥1 is determined to be false, then it is queried whether a shock in occupancy observed at time t diffocc=$occ_t$−$occ_{t-1}$ is greater than the conditional quantile function for shocks in occupancies $Q_1(\tau_2|t)$ (i.e., falling outside the band). If no, there is a conclusion of incident-free 0. If yes, then it is queried whether the observed occupancy level occ at time t exceeds the conditional quantile function for levels of occupancies $Q_2(\tau_4|t)$ (i.e., falling outside the band) to conclude detection of a potential incident downstream 1, or if less than this temporally dynamic threshold to conclude incident-free 0 (i.e., falling inside the band).

If state≤−1 is determined to be true, following line T ("true"), then an alarm for a potential incident upstream has been detected, and it is queried whether there has been an alarm for an incident identified upstream (state≤−2), and if deemed true, it is further queried whether the observed occupancy level occ at a time t is less than the conditional quantile function for levels of occupancies $Q_2(\tau_3|t)$ (i.e., falling outside the band) to conclude detection of an identified incident continuing upstream −3, or if greater than this temporally dynamic threshold to conclude incident-free 0 (i.e., falling inside the band). If state≤−2 is not deemed to be true, following line F ("false"), it is further queried whether the observed occupancy level occ at time t is less than the conditional quantile function for levels of occupancies $Q_2(\tau_3|t)$ (i.e., falling outside the band) to conclude detection of an incident identified upstream −2, or if greater than this temporally dynamic threshold to conclude incident-free 0 (i.e., falling inside the band). If state≤−1 is determined to be false, then it is queried whether a shock in occupancy observed at time t diffocc=$occ_t$−$occ_{t-1}$ is less than the conditional quantile function for shocks in occupancies $Q_1(\tau_1|t)$ (i.e., falling outside the band). If no, there is a conclusion of incident-free 0. If yes, then it is queried whether the observed occupancy level occ at time t is less than the conditional quantile function for levels of occupancies $Q_2(\tau_3|t)$ (i.e., falling outside the band) to conclude detection of a potential incident upstream −1, or if greater than this temporally dynamic threshold to conclude incident-free 0 (i.e., falling inside the band).

A simplified approach of band construction based on fixed multiples of time dependent standard deviations could be used. However, such a choice may not lead to satisfactory results when the decision variables are asymmetric/skewed.

In accordance with an embodiment of the present invention, for a decision-tree algorithm that is based on k decision variables, calibration of at most 2k+2 parameters is required. In general, such calibration can be performed based on a set that contains both incident and incident free traffic data. Given a maximum allowed false alarm rate, the chosen parameters can maximize detection rate. According to an embodiment of the present invention, a grid-search procedure can be invoked to maximize detection rate. In the example displayed above, $\tau_3$ and $\tau_4$ can be chosen to comply with a set of reported incident durations. Incident duration is dictated by occupancy levels that lie outside their band after a significant shock has been detected. Lambdas can be chosen using a roughness penalty approach, as in Koenker (2005) and $\tau_1$, $\tau_2$ can be chosen so that the detection rate is maximized for a given false alarm rate.

The illustrated methods according to embodiments of the present invention not only allow detection of an incident at its epicenter, but can track the spatio-temporal evolution of incident effects. In addition, using the methods of the embodiments, with additional quantiles, permits characterization of incidents in terms of severity. For example, given a detected incident from the decision trees presented FIG. 2, if $occ > \tilde{\tau}_4$ with $\tilde{\tau}_4 > \tau_4$, incident effects may be characterized as severe for the specific time instant and at the specific location of the road network.

Figure 4:
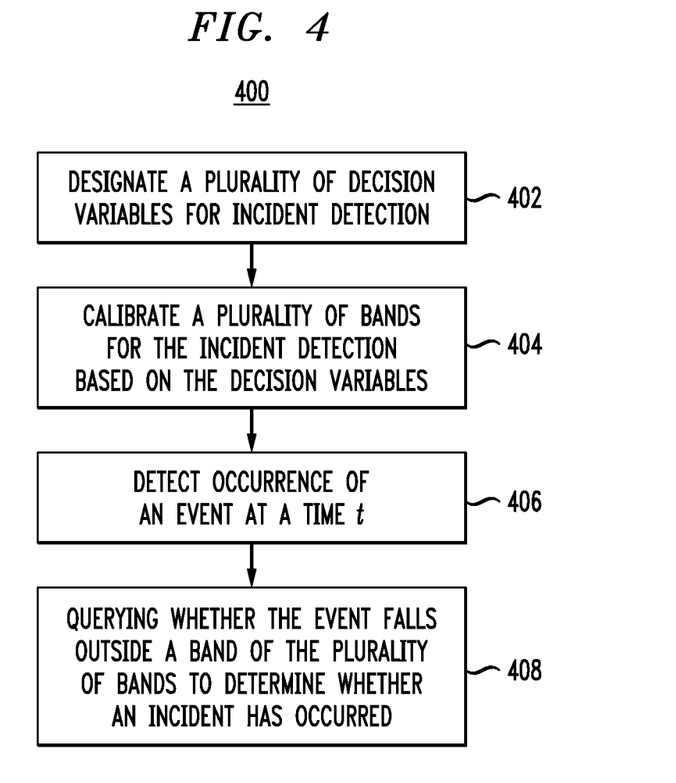
FIG. 4 is a flow diagram of a method for incident detection according to an exemplary embodiment of the present invention.

Referring to FIG. 4, a method for incident detection 400 according to an exemplary embodiment of the present invention includes designating a plurality of decision variables for incident detection (Step 402), and calibrating a plurality of bands for the incident detection based on the decision variables (Step 404). The plurality of bands define thresholds that are time-varying for all measurement locations in a network, and the thresholds are estimated using nonparametric quantile regression.

Calibration is performed using 2k+2 parameters, and wherein k is the number of decision variables. The method further includes detecting occurrence of an event at a time t (Step 406), and querying whether the event falls outside a band of the plurality of bands to determine whether an incident has occurred (Step 408). By determining whether an event falls above or below a band, the determination of an occurrence of a downstream incident and an occurrence of an upstream incident in the network is performed using a same band. Querying whether the event falls outside a band of the plurality of bands is performed by querying whether the event is less than or greater than a conditional quantile function for a decision variable to determine whether the incident has occurred.

Figure 5:
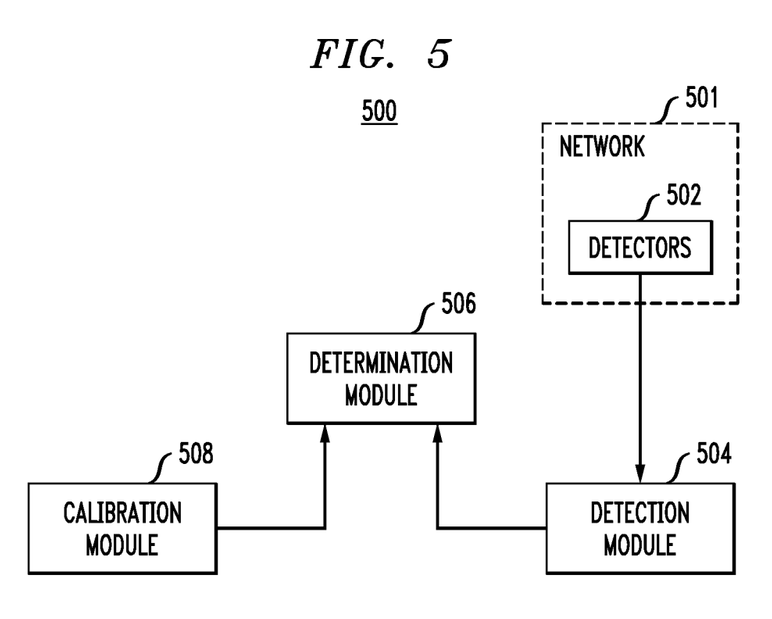
FIG. 5 is a high-level diagram of a system for incident detection according to an exemplary embodiment of the present invention.

Referring to FIG. 5, a system 500 for incident detection according to an exemplary embodiment of the present invention comprises a network 501 (e.g., traffic network) including detectors 502 for detecting events at various points (e.g., upstream and downstream portions on a road) in the network 501, a detection module 504 capable of processing data from the detectors 502, and a calibration module 508 capable of calibrating a plurality of bands for the incident detection based on a plurality of decision variables. The plurality of bands define thresholds that are time-varying for all measurement locations in the network 501, and the thresholds are estimated using nonparametric quantile regression.

The calibration module 508 performs the calibration using 2k+2 parameters, and wherein k is the number of decision variables. The detection module 504 processes the data from a detector to detect occurrence of an event at a time t, and the system further comprises a determination module 506 capable of querying whether the event falls outside a band of the plurality of bands to determine whether an incident has occurred. More specifically, the determination module 506 queries whether the event is less than or greater than a conditional quantile function for a decision variable to determine whether the incident has occurred. By determining whether an event falls above or below a band, the determination module 506 can use a same band of the plurality of bands to make a determination of an occurrence of a downstream incident and an occurrence of an upstream incident in the network 501.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 2-5 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 6:
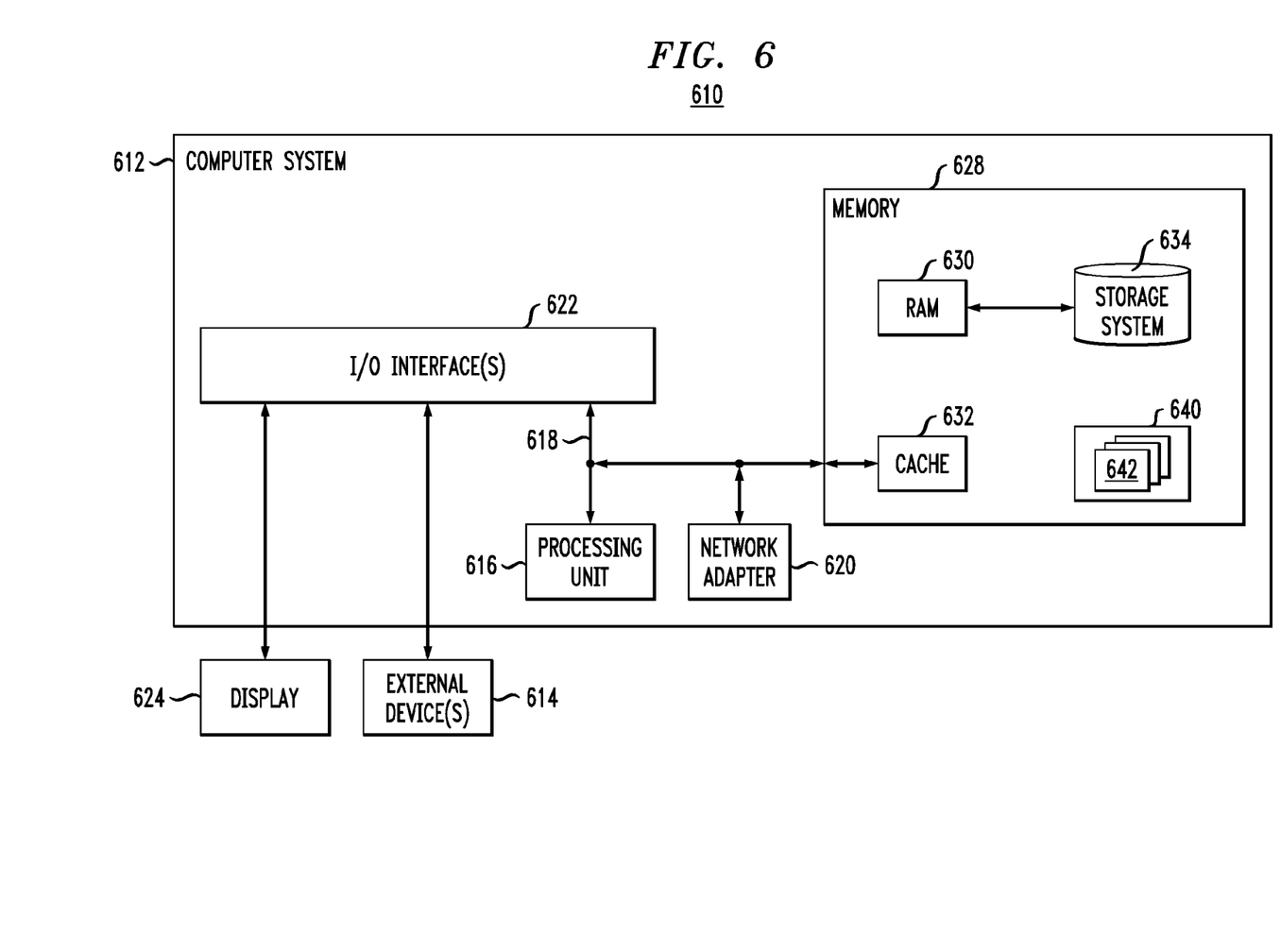
FIG. 6 illustrates a computer system in accordance with which one or more components/steps of the techniques of the invention may be implemented, according to an exemplary embodiment of the invention.

One or more embodiments can make use of software running on a general-purpose computer or workstation. With reference to FIG. 6, in a computing node 610 there is a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 612 may be described in the general context of computer system executable instructions, such as program modules, being executed by a computer system. Generally, program modules may include routines, programs, objects, components, logic, data structures, and so on that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computing node 610 is shown in the form of a general-purpose computing device. The components of computer system/server 612 may include, but are not limited to, one or more processors or processing units 616, a system memory 628, and a bus 618 that couples various system components including system memory 628 to processor 616.

The bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 612 typically includes a variety of computer system readable media. Such media may be any available media that is accessible by computer system/server 612, and it includes both volatile and non-volatile media, removable and non-removable media.

The system memory 628 can include computer system readable media in the form of volatile memory, such as random access memory (RAM) 630 and/or cache memory 632. The computer system/server 612 may further include other removable/non-removable, volatile/nonvolatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 618 by one or more data media interfaces. As depicted and described herein, the memory 628 may include at least one program product having a set (e.g., at least one) of program modules that are configured to carry out the functions of embodiments of the invention. A program/utility 640, having a set (at least one) of program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer system/server 612 may also communicate with one or more external devices 614 such as a keyboard, a pointing device, a display 624, etc., one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method for incident detection, the method comprising:
    designating a plurality of decision variables for incident detection;
    detecting, at a predetermined location over a predetermined time period, data for determining the plurality of decision variables;
    determining the plurality of decision variables over the predetermined time period;
    calibrating a plurality of bands for the incident detection based on the determined decision variables, wherein:
        the plurality of bands define thresholds that are time-varying for all measurement locations in a network; and
        the thresholds are estimated using nonparametric quantile regression;
    detecting data corresponding to a decision variable at a particular time t;
    determining the decision variable at the time t;
    querying whether the decision variable at the time t falls outside a band of the plurality of bands to determine whether an incident has occurred; and
    issuing an alert in response to a determination that the incident has occurred;
        wherein the querying comprises comparing the decision variable at the time t with a time-varying threshold defined by the band at the time t;
        wherein the detecting is performed by at least one sensor;
        wherein the sensor records occupancy at the predetermined location over the predetermined time period by recording a passage of each traveling element on the network over a fixed loop;
        wherein the alert is issued at a command center capable of responding to the incident; and
        wherein one or more steps of the method are performed by a computer system comprising a memory and at least one processor coupled to the memory.

2. The method according to claim 1, wherein a determination of an occurrence of a downstream incident and an occurrence of an upstream incident in the network is performed using a same band of the plurality of bands.

3. The method according to claim 1, wherein at least two thresholds respectively comprise upper and lower limits of a band of the plurality of bands and a width of the band is variable over time.

4. The method according to claim 1, wherein the decision variables represent a shock in occupancy and an occupancy level at a time.

5. The method according to claim 4, wherein calibration is performed using a plurality of parameters, wherein first and second parameters are quantiles for shocks in occupancies, and third and fourth parameters are quantiles for occupancy levels.

6. The method according to claim 5, wherein fifth and sixth parameters control a degree of smoothness for respective conditional quantile functions for the shocks in occupancies and the occupancy levels.

7. The method according to claim 1, wherein:
    the comparing comprises determining whether the decision variable at the time t is less than or greater than a conditional quantile function for the decision variable to determine whether the incident has occurred.

8. The method according to claim 1, further comprising utilizing variable state values representing both upstream and downstream incidents in the network.

* * * * *